Patented Aug. 31, 1954

2,687,960

UNITED STATES PATENT OFFICE 2,687,960

METHOD OF MAKING A PREPARED SWEET POTATO FLOUR MIX AND PRODUCT

Ruth C. Sharp, San Francisco, Calif., assignor of one-half interest to Baxter R. Sharp, San Francisco, Calif.

No Drawing. Application November 10, 1949, Serial No. 126,685

8 Claims. (Cl. 99—94)

This invention relates not only to the product but to the process of preparing flours for making doughnuts and the like, and more particularly to a process for combining sweet potatoes with the other ingredients of such flours in such a manner as to form smooth homogeneous mixtures which are highly stable and which can readily be stored in commercial quantities.

In the preparation of flours for making doughnuts and other specialized bakery products, improved color, texture and uniformity in the finished product is best accomplished with a minimum expenditure of time and expense by the utilization of a prepared flour or mix to which only water need be added in cake type flours in order to form the dough mixture and as usual, water and yeast, need be added in raised mixes.

In the processes of the prior art, it has frequently been necessary in order to achieve the required keeping qualities to combine the various flour ingredients with a chemical preservative, a practice which often substantially detracts from the distinctive and/or natural flavor which is characteristic of the particular flour. Moreover, the flour mixtures prepared by the processes heretofore used frequently require the addition of solids in addition to water to form the dough mixture, and often do not produce a dough having a sufficient glutenous content to retain the desired shape during baking.

It is an important object of the present invention, therefore to provide a process for combining the various ingredients of prepared flour mixtures for doughnuts and the like in such a manner as to attain good keeping qualities in the flours without the addition of ingredients tending to detract from the inherent taste characteristics thereof.

It is also an object of the invention to provide a process for combining the various ingredients of a sweet potato doughnut flour in such a manner as to attain good keeping qualities in the flour without the addition of preservatives tending to detract from the natural flavor thereof.

Another object of the invention is to provide a process of mixing and blending prepared doughnut flours with sweet potatoes to form dry flour mixtures having good keeping qualities, which mixtures require only the addition of water in the cake mix and water and a levening agent in the raised mix to form a glutenous doughnut dough while still preserving the sweet potato taste characteristic of the mixture.

Still another object of the invention is to provide a process of mixing and blending prepared doughnut flours with sweet potatoes to form relatively stable dry flour mixtures which require only the addition of water or water and a levening agent, as the case may be, to form a dough adapted to produce doughnuts of improved texture and which retain the natural characteristic taste of sweet potatoes.

Another object of the present invention is to provide a new article of commerce, stable flour mixes which contain sweet potato.

It is likewise an object to provide stable, quality flour mixes which contain sweet potato and which require only the addition of water in the cake mix, and water and a levening agent in the raised mix, to produce a dough ready for immediate use.

Further objects are to provide a product and processing method of maximum simplicity, economy and ease of operation and such further objects, advantages and capabilities as will fully appear and as are inherently possessed by the invention described herein. It will be understood that the same is merely illustrative of the invention and that the same is capable of modification and change and comprehends other details of construction without departing from the spirit thereof or the scope of the appended claims.

In the production of sweet potato flours for a raised mix, having particular usefulness in making doughnuts and the like, there is no sweet potato flour known and because of this fact cooked sweet potatoes must be used and to do this requires the special treatment and process disclosed herein. Accordingly approximately 12 pounds of pre-cooked sweet potatoes, which preferably are of a commercially available grade, such as are frequently packed in tin cans, are placed in a cake mixing machine or other suitable apparatus capable of high speed whipping, and mixed until a smooth mixture has been produced. Thereafter approximately 3 oz. of a dry mixture composed of equal parts of granulated table sugar and table salt, well mixed, is added to the sweet potatoes and mixed again until these are completely dissolved. This dry mixture produces a mild abrasive action during the mixing operation in the cake machine before completely dissolving therein, thus further breaking down the sweet potato pulp to form a creamy homogeneous mass.

During the next stage of the flour mixing operation, the following ingredients are added to the sweet potato mixture in the cake mixing machine, approximately in the quantities indicated:

24 lb. sugar
48 lb. animal or vegetable shortening
6 lb. salt
6 oz. lemon oil-base flavoring
1½ oz. imitation vanilla concentrate
9 lb. skim milk powder
6 lb. full fat soya flour
12 lb. potato flour Next, the operation of the cake mixing operation is continued until the above ingredients are thoroughly mixed with the sweet potato mixture and with each other so as to produce a smooth, fluffy and homogeneous mixture which will be hereinafter referred to as mixture A. It will be observed that the materials added to the sweet potato creamy mass are the usual ingredients required for a doughnut flour and may be varied to suit individual taste or the quality and characteristics of the final product.

Mixture B is then produced by independently combining the following ingredients in a separate mixing machine, such as a dough mixer, approximately in the quantities indicated:

80 lb. short patent dark red wheat (12.2 per cent protein)
236 lb. hard northern white bluestem flour (10.6 per cent protein)

As soon as mixture B, which may be characterized as the dry mix, has been thoroughly blended and mixed, mixture A is transferred from the first mixing machine and added thereto. The resulting mass is mixed and blended for approximately twenty minutes in the second mixing machine so as to produce a substantially dry flour of the present invention. Such a flour retains the distinctive taste, qualities and flavor imparted thereto by the sweet potatoes, and this final flour mixture has such excellent inherent keeping qualities that the addition of chemical preservatives, tending to adversely affect the natural flavor of the flour, is not required in packaging the flour mixture for purposes of sale, transportation and storage until the time of use. The raised mix, when prepared in accordance with the present process, requires merely the addition of water, a levening agent such as yeast, and a final mixing to produce a dough which, when formed into predetermined shapes and cooked, produces doughnuts and the like, which have a light creamy texture, are characterized by the distinctive flavor of sweet potatoes, and are readily and easily browned to the desired color. The dough thus produced is also sufficiently glutenous to substantially minimize or eliminate crumbling during the cooking operation or subsequent handling of the doughnut.

It is also practical to use the methods and steps of the present invention to produce a cake-type doughnut mix utilizing sweet potatoes which has substantially the same beneficial characteristics, such as quality, taste and keeping qualities without the addition of chemical preservatives.

The production of the sweet potato flour for a cake mix having particular usefulness in making doughnuts and the like, calls for the same 12 pounds of precooked sweet potatoes which are whipped or beaten as before described and further reduced to a creamy homogeneous mass with 3 oz. of a dry mixture of equal parts of granulated sugar and salt.

To this sweet potato mass, the wet ingredients are added as before but in the following general proportions, which may be varied to suit individual requirements as to taste, quality or character of the final product:

48½ lb. sugar
2 lb. 4 oz. salt
7½ lb. egg yolk (powdered)
1 lb. 14 oz. animal or vegetable shortening
3¼ oz. vanilla concentrate
3¼ oz. lemon oil-base flavoring
1½ oz. mace
4½ oz. nutmeg The sugar, salt and egg yolk ingredients are preferably added first and mixed, before the remainder of the ingredients are added to complete mixture A-1.

Again, as before, the dry ingredients are mixed independently to form mixture B-1, comprising substantially the following ingredients:

123 lb. cake and pastry flour
24¾ lb. Olympic (bluestem flour)
6½ lb. milk powder
7½ lb. baking powder All of these are thoroughly mixed as before described to make the mixture B-1. Although any standard baking powder or other suitable levening agent may be used, it has been found preferable to mix such as:

4 lb. sodium acid pyrophosphate
2½ lb. soda
1 lb. 10 oz. cornstarch and use this mixture as the baking powder ingredient.

Mixture A-1 is then added to mixture B-1 and the entire mass is then mixed and blended for approximately twenty minutes, to produce a dry cake flour mix which requires only the addition of water to produce a dough.

I claim:

1. In the process of making a dry prepared doughnut flour mix by mixing a predetermined quantity of sweet potatoes with predetermined weights of each of a plurality of liquid and solid flour components, the steps which comprise forming a smooth mixture of precooked sweet potatoes, mixing soluble solids with the sweet potatoes in such a manner as to further pulverize the said potato fibers by the abrasive action of the said solids and to form a smooth paste therewith when completely dissolved therein, blending additional solid and liquid components with the said paste to form a first flour faction, independently mixing dry wheat flour components together to form a second flour faction, and finally mixing the said first and second flour factions with each other so as to produce the said dry doughnut flour.

2. In the process of imparting the natural flavor of sweet potatoes permanently to a dry prepared cake flour mix composed of predetermined quantities of various solids and flavoring liquids, the steps which comprise forming a smooth mixture of precooked sweet potatoes, mixing soluble solids with the said sweet potatoes in such a manner as to further pulverize the said potato fibers by the abrasive action of the said solids before the said solids become completely dissolved therein to form a smooth sweet potato paste, blending additional solid components comprising dry wheat flour, dry milk and dry baking powder with the said sweet potato paste to produce a relatively stable cake flour mixture having good keeping qualities and retaining the natural flavor of sweet potatoes.

3. In the process of permanently imparting the natural flavor of sweet potatoes to a dry prepared flour mix of the type which requires only the addition of water to produce a glutenous dough for making doughnuts and the like, the steps which comprise forming a smooth mixture of precooked sweet potatoes, mixing soluble solids with the said potato mixture to form therewith a smooth paste, and blending the said paste with the remaining dry ingredients comprising wheat flour in such a manner as to produce a prepared flour requiring no chemical additives to impart good keeping qualities thereto and to produce a dry flour possessing the characteristic natural flavor of sweet potatoes.

4. In the process of permanently imparting the natural flavor of sweet potatoes to a substantially dry prepared flour mix of the type which requires only the addition of water to produce a dough suitable for making doughnuts and the like, the steps which comprise, forming a smooth mixture of precooked sweet potatoes, mixing soluble solids with the said potato mixture ultimately to form therewith a smooth paste, the said solids having an abrasive action with the said mixture prior to being completely dissolved therein, blending the said paste with additional ingredients to form a first flour faction, independently mixing predtermined dry wheat flour components of short patent dark red wheat and hard northern white bluestem flour together to form a second flour faction, and finally mixing the said first and second flour factions with each other in such a manner as to produce a dry prepared flour possessing the characteristic natural flavor of sweet potatoes and requiring no chemical preservatives to impart good keeping qualities thereto.

5. A new article of commerce being a prepared dry raised mix containing from 4% to 15% by weight of precooked sweet potatoes which have been whipped to a fluffy state so as to break down their natural fibrous form.

6. A new article of commerce being a prepared dry cake mix containing from 4% to 15% by weight of precooked sweet potatoes which have been whipped to a fluffy condition so as to break down their natural fibrous form.

7. A prepared dry cake mix requiring only the addition of water to make a dough, containing 4% to 15% by weight of precooked and whipped sweet potatoes.

8. In the process of claim 2 the step of substituting a leavening agent composed of sodium acid pyrophosphate, soda and cornstarch, in place of baking powder.

References Cited in the file of this patent

UNITED STATES PATENTS

| Number | Name | Date |
|---|---|---|
| 310,927 | Whitcomb | Jan. 20, 1885 |
| 696,088 | Straus | Mar. 25, 1902 |
| 1,167,133 | Tierney | Jan. 4, 1916 |
| 1,194,455 | Williams | Aug. 15, 1916 |
| 1,238,371 | Williams | Aug. 28, 1917 |
| 1,761,738 | Miller | June 3, 1930 |
| 1,834,747 | Stokes et al. | Dec. 1, 1931 |
| 2,168,246 | Shepherd | Aug. 1, 1939 |

OTHER REFERENCES

Dollars in Doughnuts, pub. by Procter and Gamble, Cincinnati, Ohio, 1933, pages 2, 14 to 16.

Winton, Structure and Composition of Foods, John Wiley & Sons, N. Y., 1935, page 102.

Lord, Everybody's Cook Book, Harcourt Brace and Co., N. Y., 1937, page 175.

Ware et al., Food Industries, vol. 19, No. 10, October 1947, pp. 101, 200, 202 (vol. pp. 1365, 1464, 1466).